United States Patent [19]

Shen et al.

[11] Patent Number: 5,694,276
[45] Date of Patent: Dec. 2, 1997

[54] SHIELDED MAGNETIC HEAD HAVING AN INDUCTIVE COIL WITH LOW MUTUAL INDUCTANCE

[75] Inventors: Yong Shen, Milpitas; Steven C. Rudy, San Jose; Vincent D. Retort, Pleasanton, all of Calif.

[73] Assignee: Read-Rite Corporation, Milpitas, Calif.

[21] Appl. No.: 673,947

[22] Filed: Jul. 1, 1996

[51] Int. Cl.$^6$ .................................................. G11B 5/39
[52] U.S. Cl. ........................................... 360/113; 360/126
[58] Field of Search .................................. 360/113, 126

[56] References Cited

U.S. PATENT DOCUMENTS 5,493,466  2/1996  Suyama ............................. 360/113

*Primary Examiner*—A. J. Heinz
*Attorney, Agent, or Firm*—Nathan N. Kallman

[57] ABSTRACT

A magnetic head assembly includes a magnetoresistive (MR) read sensor dielectrically disposed between a magnetic shield layer and a first pole layer. A write transducer comprises an inductive coil having a plurality of windings dielectrically disposed between the first pole layer and a second pole layer. The magnetic shield layer partially overlaps portions of the coil windings. A nonmagnetic layer is coplanar with the magnetic shield layer. A reduced coupling area between the magnetic shield layer and the coil decreases the mutual inductance applied to the magnetic coil by the magnetic layer, resulting in the coil having better response to write current and being capable of operating at wider frequency ranges. The first pole layer includes a unique shape having a narrow mid-section integrally formed between the wider end sections. The narrow mid-section of the first pole layer also reduces the coupling area between the first pole layer and the coil and reduces the mutual inductance from the first pole layer to the coil.

22 Claims, 7 Drawing Sheets

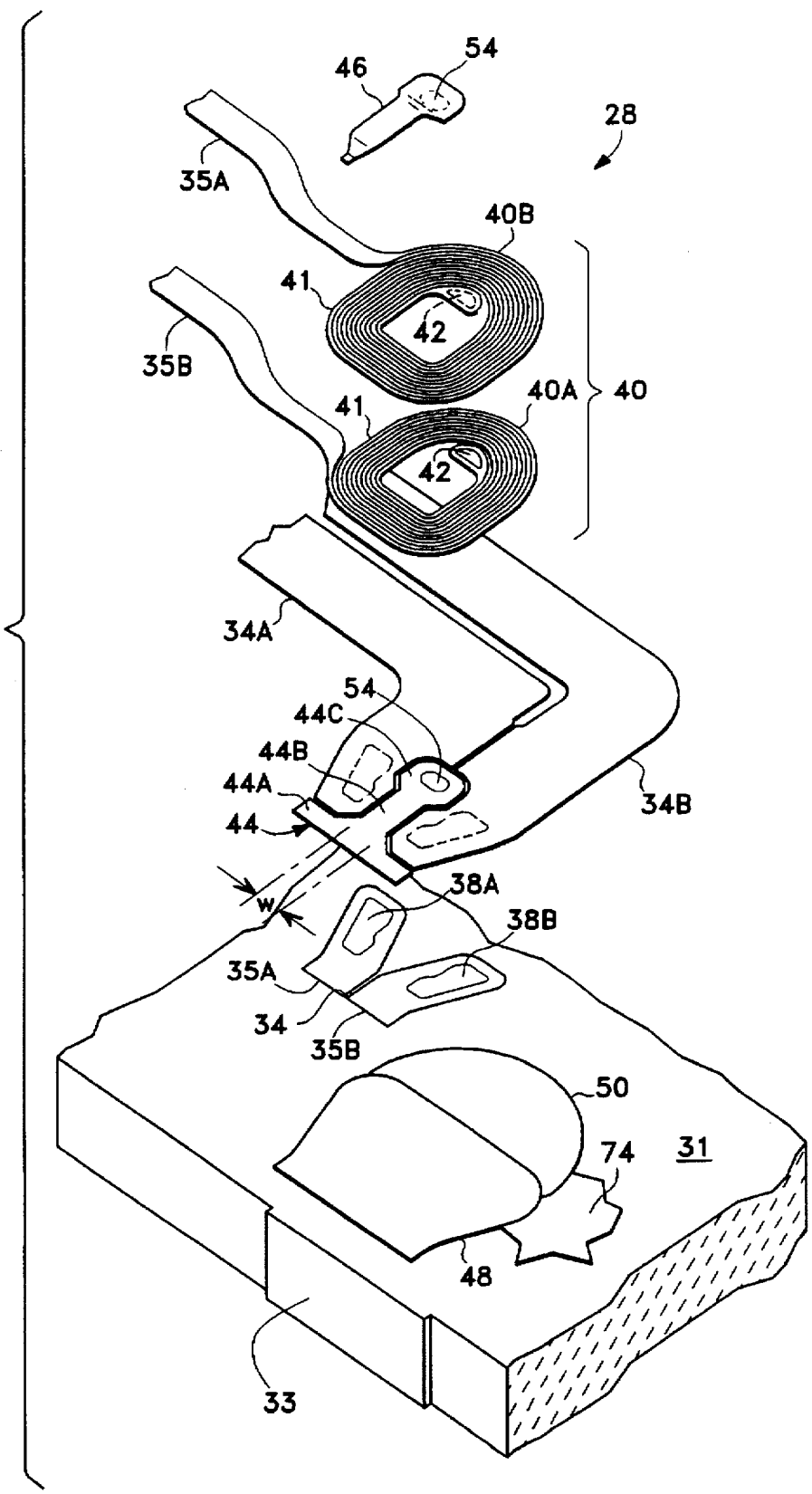

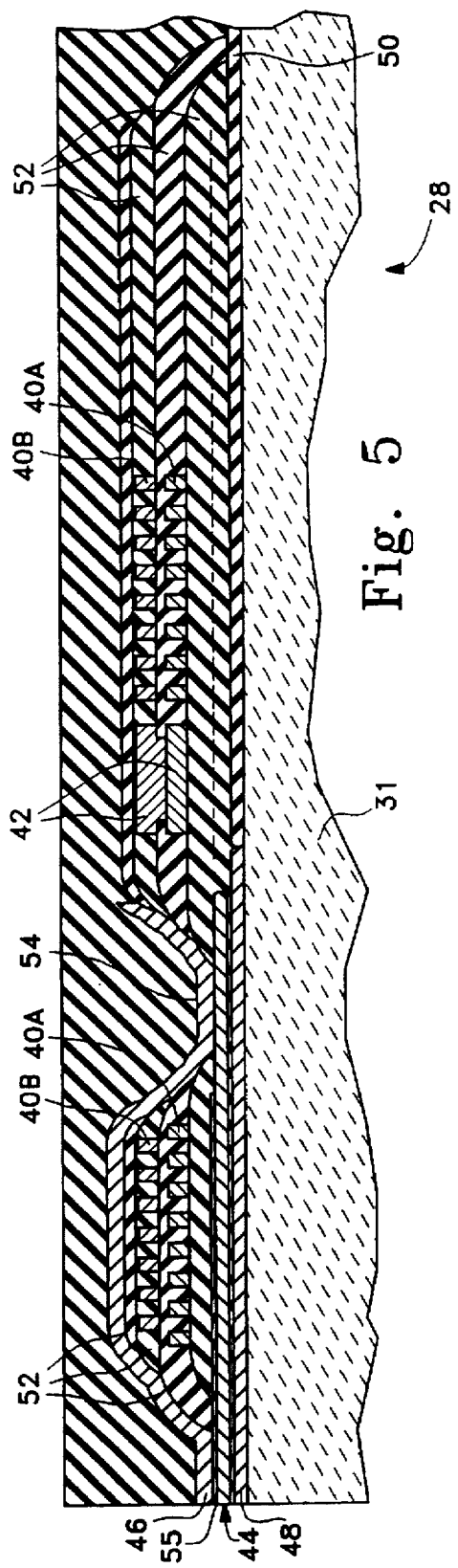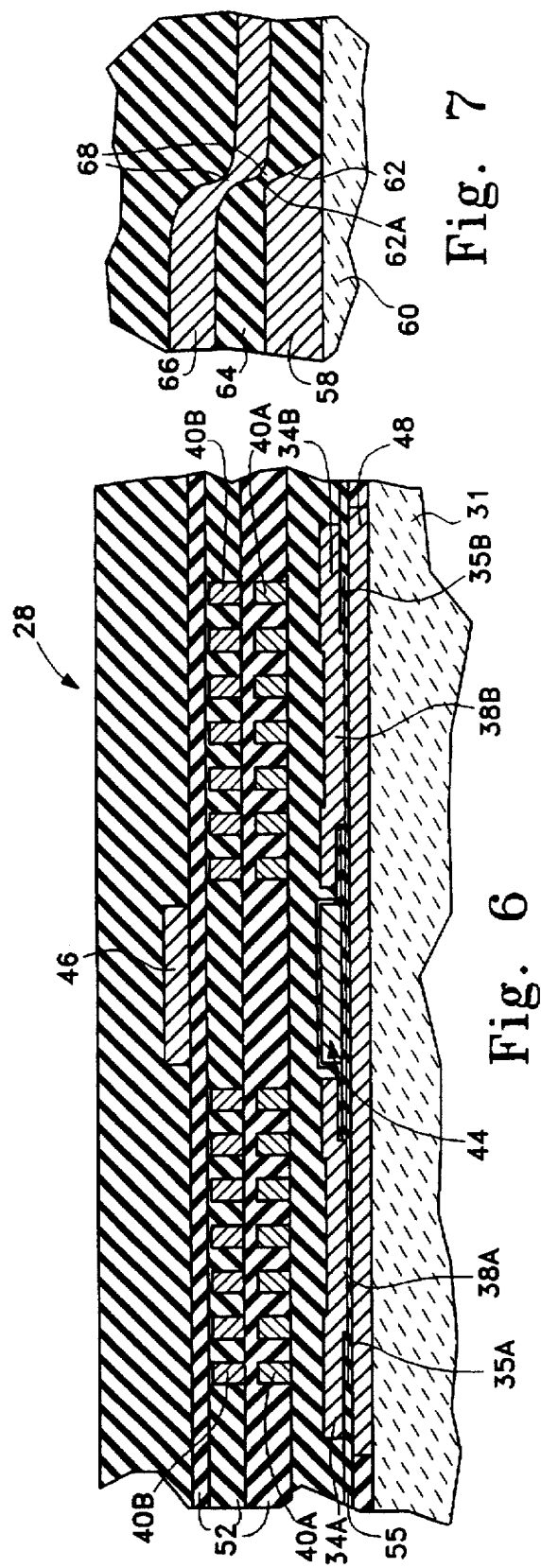

SHIELDED MAGNETIC HEAD HAVING AN INDUCTIVE COIL WITH LOW MUTUAL INDUCTANCE

FIELD OF THE INVENTION

This invention relates to magnetic heads having low mutual inductance between the electrical coils and the magnetic layers of the heads.

BACKGROUND OF THE INVENTION

Magnetic data storage systems typically include a magnetic recording medium, such as a magnetic disk or tape, and magnetic heads or transducers that coact with the medium to write and read data. Presently, disk drives incorporating magnetic disks are widely used for storage of data. Magnetic transducers or heads interact with the magnetic recording medium to write and read data. In the prior art, inductive heads or transducers were used for both writing and reading data. Presently, magnetoresistive (MR) sensors or MR read transducers are used for reading data recorded by inductive write heads. An MR transducer can read information on a magnetic recording medium with much narrower track widths and operates with an improved signal-to-noise ratio. Also, the output signal generated during the read process is independent of the traveling speed of the recording medium. Consequently, a higher recording density on the magnetic recording medium is made possible.

Currently, magnetoresistive (MR) heads are designed with the read and write transducers merged together. Instead of using separate transducers for the data reading and writing functions in an MR magnetic head, a typical design of a merged magnetic head is to have the write transducer "piggy backed" onto the read transducer. A magnetic head with a merged design typically includes an MR sensor sandwiched between a magnetic shield layer and a first pole layer which also serves as a second shield. The MR sensor is separated from the shield and pole layer by insulating material. A second pole layer is deposited above the first pole layer with an inductive coil surrounded by insulating material between the pole layers. The two magnetic pole layers come into direct contact with each other at a back region at one end and are separated from each other by a narrow insulating layer at an opposite end to provide a transducing gap which serves as a write gap.

During the write mode, electrical current representing data is passed through the inductive coil. The current-carrying coil induces magnetic flux in the magnetic poles. It is well known that increased inductance will degrade the high frequency response of the inductive write head. In U.S. Pat. No. 5,255,142, to Williams et al., entitled "Thin Film Magnetic Head With Narrow Yoke", issued Oct. 19, 1993, the first pole layer and second pole layer are decreased in width within a range from 5 to 58 microns in order to reduce noise, improve high frequency response, and increase head efficiency. Since the first pole layer in an MR head with a merged design must also function as the second shield, the claimed first pole layer structure is not compatible with such designs. Second pole layer structures as described by Williams et al. can be directly utilized in the write head structures of magnetoresistive magnetic heads. Increasing first pole layer width and second pole layer width in the backgap region independent of the nominal width in the region between pole and backgap allows separate optimization of backgap magnetic saturation and high frequency response of the write head.

During the read mode, the magnetic shield and the first pole act as magnetic shields so that only flux from the magnetic recording medium nearest the MR sensor can be sensed by the MR sensor. The magnetic recording medium provides changes in magnetic flux which correspondingly varies the resistivity of the MR layer in the read sensor. A direct electric current passing through the MR layer generates a varying voltage which represents the data stored in the magnetic recording medium.

In an MR magnetic head with a merged design, the first pole serves dual functions as a shield for the MR sensor as well as a pole for the inductive head. Accordingly, the need for an extra shield layer and the associated necessary processing steps during manufacture are eliminated.

There are technical complications associated with the manufacture of an MR magnetic head. A major problem is proper step coverage. A magnetic head is a multilayered structure in which the overlying layers are less orderly in surface regularity than the underlying layers. That is, the overlying layers in a multilayer structure encounter more topographical unevenness than the lower layers. As a consequence, the problems arising from the processing of the overlying layers are highly significant, and adversely affect manufacturing yield and performance reliability of the magnetic head.

Attempts have been made in the past to alleviate the aforementioned problems. A general approach is to have extensive and flat underlying layers as foundation for the subsequently deposited layers. In the processing of a magnetic head, it is common to extend the first magnetic shield layer beyond the perimeter of the inductive coil such that the magnetic shield layer forms a level base on which the entire magnetic head is deposited. The drawback with this approach is that the magnetic shield layer is made of ferromagnetic material. The magnetic shield layer and the coil are separated by the first pole layer which is also ferromagnetic. The mutual inductance caused by the first pole layer and the extensive magnetic shield layer impinging upon the coil is significant. An inductive coil with high inductance is sluggish in response to write current and cannot function at high frequency ranges.

In U.S. Pat. No. 5,486,968, Lee et al., entitled "Method and Apparatus for Simultaneous Write Head Planarization and Lead Routing", issued Jan. 23, 1996, electrical leads disposed in juxtaposition with the first pole layer are utilized as a planarization base for the overlying coil. However, underneath the electrical leads and the first pole layer is the extensive magnetic shield layer in which the substantial mutual inductance induced into the coil still remains.

Storage products are now built with ever decreasing physical sizes and increasing memory capacities. Data tracks on a magnetic recording medium are registered with narrower track widths and higher linear density. The magnetoresistive sensor can be built at a miniaturized scale to accommodate the narrower and denser data tracks. However, high inductance devices operate at a low frequency bandwidth and cannot write data tracks with high density at high speed. For these reasons, there is a need to provide magnetic heads that are capable of writing data as fast as reading data.

SUMMARY OF THE INVENTION

It is an object of the invention to provide a magnetic head in which the write transducer is characterized by low inductance thereby allowing the magnetic head to respond to data write current rapidly and to operate at a wide frequency bandwidth.

It is another object of the invention to provide a magnetic head capable of high frequency operations yet with simplicity in design with resultant lowered manufacturing costs.

In accordance with this invention, a magnetic head includes a read transducer having a read sensor dielectrically disposed between a magnetic shield layer and a first pole layer; and a write transducer comprising an inductive coil having a plurality of windings dielectrically disposed between the first pole layer and a second pole layer. The magnetic shield layer partially overlaps portions of the coil windings through the first pole layer. In addition, there is a nonmagnetic layer disposed in juxtaposition and coplanar with the magnetic shield layer. Without a large coupling area between the magnetic shield layer and the coil, the mutual inductance applied to the coil by the magnetic shield layer is substantially reduced, resulting in the coil being more responsive to write current and capable of operating at wider frequency ranges. Furthermore, the first pole layer includes a specially shaped boundary having a narrow mid-section integrally formed within wider end sections. The narrow mid-section of the first pole layer also lessens the coupling area between the first pole layer and the coil and further reduces the mutual inductance from the first pole layer to the coil. The magnetic head of this invention experiences less mutual inductance derived from the neighboring magnetic shield and pole layers.

These and other features and advantages of the invention will be apparent to those skilled in the art from the following detailed description, taken together with the accompanying drawings, in which like reference numerals refer to like parts.

BRIEF DESCRIPTION OF THE DRAWINGS

FIG. 4 is an exploded perspective view of the magnetic head shown in FIGS. 2 and 3 illustrating the relative arrangements of the various layers;

FIG. 5 is a cross-sectional view, partly broken away, taken along the line 5—5 of FIG. 3;

FIG. 6 is a cross-sectional view, partly broken away, taken along the line 6—6 of FIG. 3;

FIG. 7 is a fragmentary cross-sectional side view showing schematically the problem of step coverage of layers in the processing of thin film structures;

DETAILED DESCRIPTION OF THE INVENTION

Figure 1:
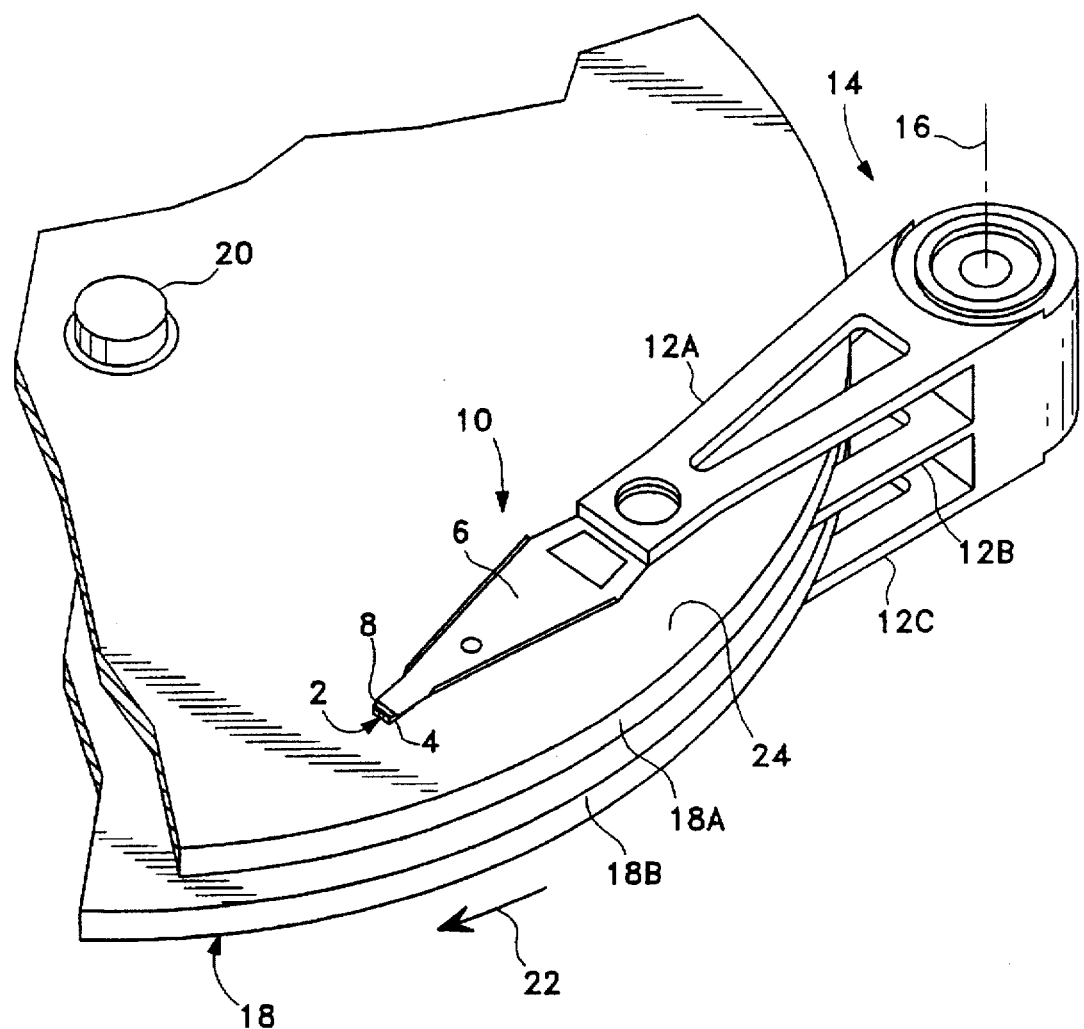
FIG. 1 is a fragmentary perspective view of an exemplary use of the magnetic head of the invention.

With reference to FIG. 1, a magnetic head or transducer 2 is affixed to an air bearing slider 4, which in turn is coupled to a load beam 6 through a flexure 8. The slider 4, the flexure 8, and the load beam 6 form a gimbal assembly 10 which is associated with an actuator arm 12A of an arm assembly 14 that is rotatable about an axis 16 relative to a stack of spaced disks 18 rotatable about a common spindle 20. The arm assembly 14 includes a plurality of actuator arms 12A–12C which extend to the disks 18A and 18B.

During normal operations, the disks 18A and 18B spin at high speed in a direction designated by arrow 22 about the spindle 20. The aerodynamics between the air bearing slider 4 and the rotating disk surface 24 causes the slider to fly over the disk at a very close spacing or flying height, as is well known.

Figure 2:
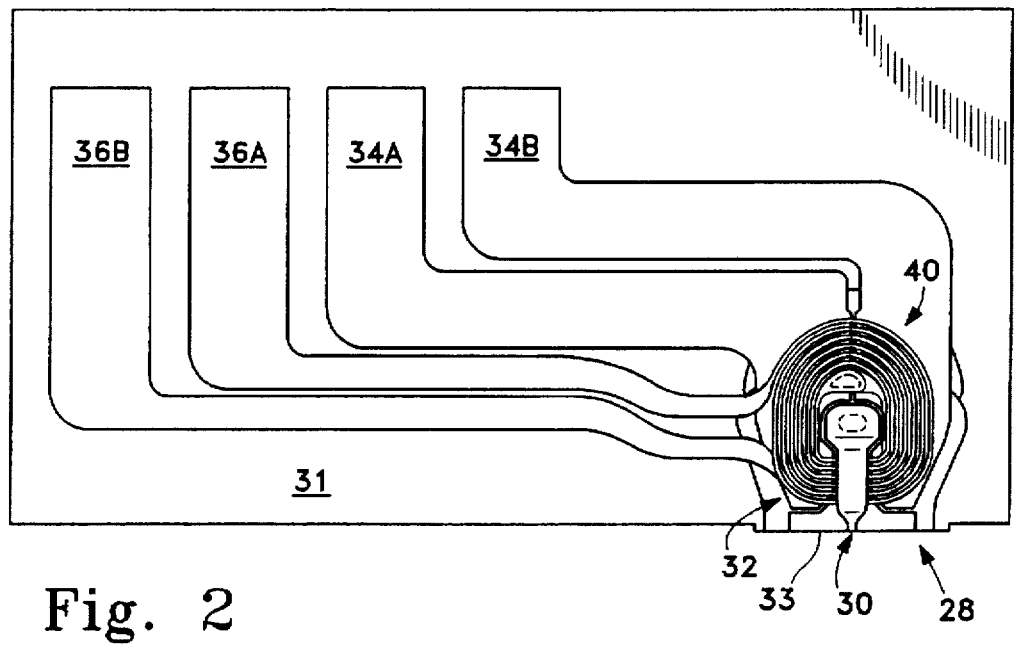
FIG. 2 is a top elevational view of one embodiment of the magnetic head of the invention.
Figure 3:
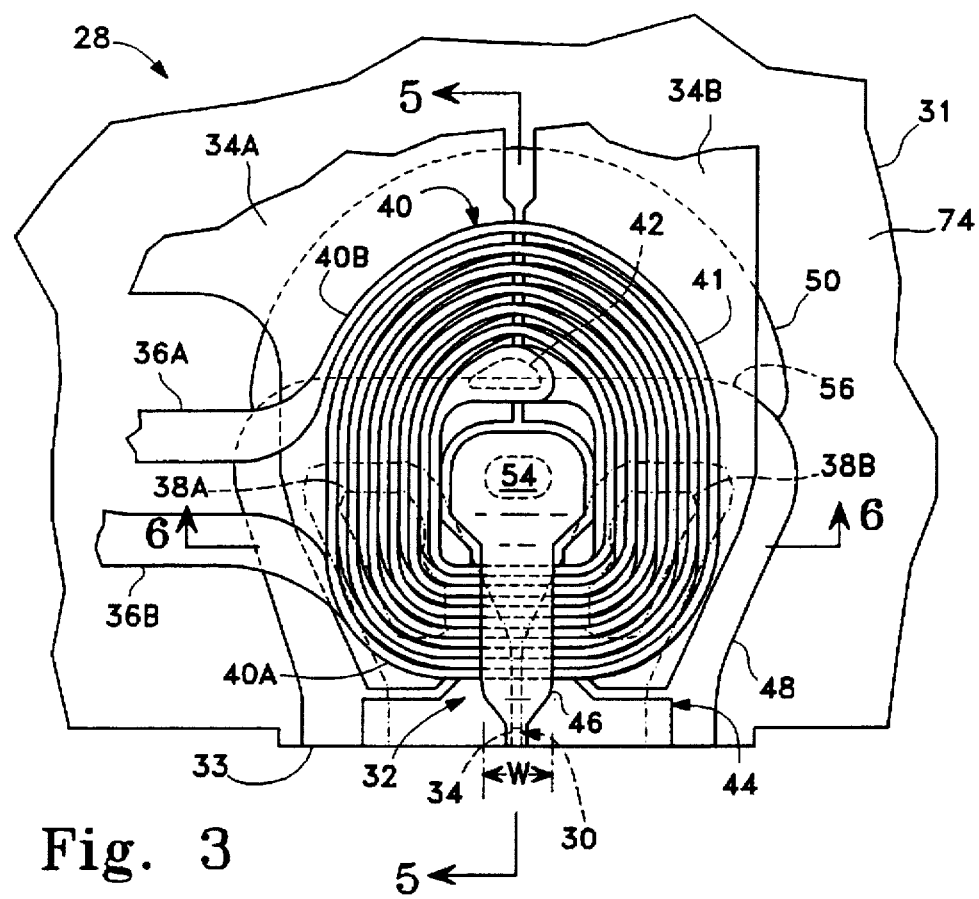
FIG. 3 is an enlarged elevational view of the magnetic head of FIG. 2 showing the write and read transducers in detail.
Figure 8:
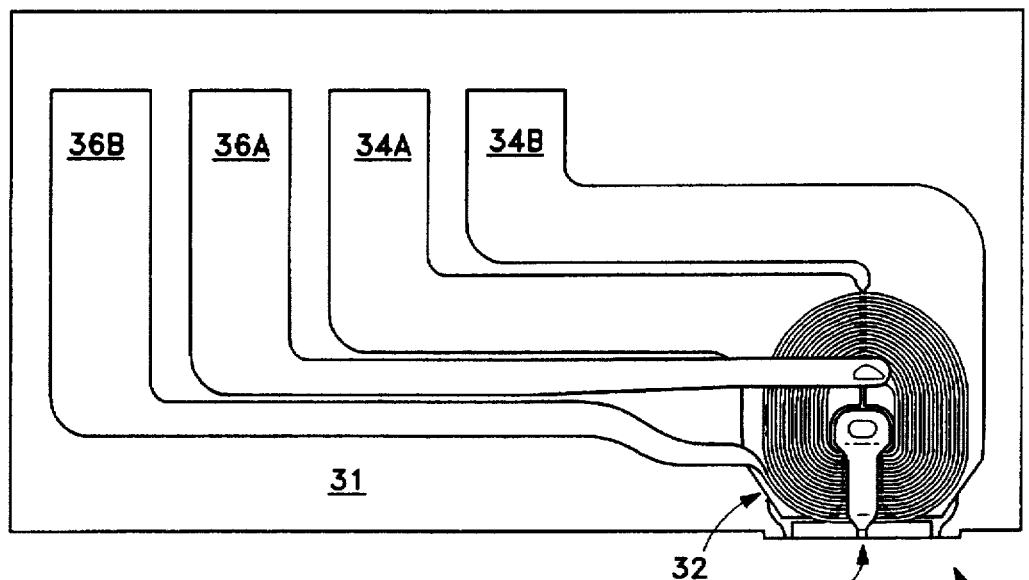
FIG. 8 is a top elevational view of a second embodiment of the magnetic head of the invention.
Figure 9:
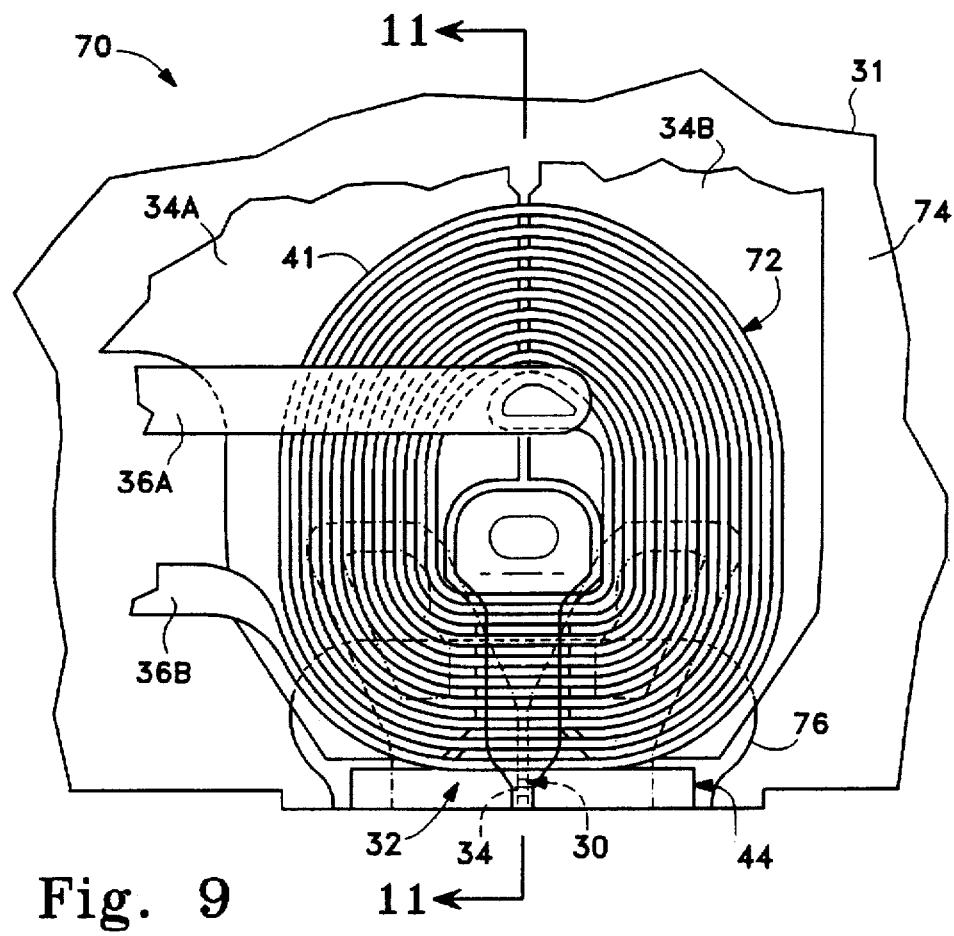
FIG. 9 is an enlarged elevational view, in part, of the magnetic head of the invention as shown in FIG. 8 showing the write and read transducers in detail.
Figure 10:
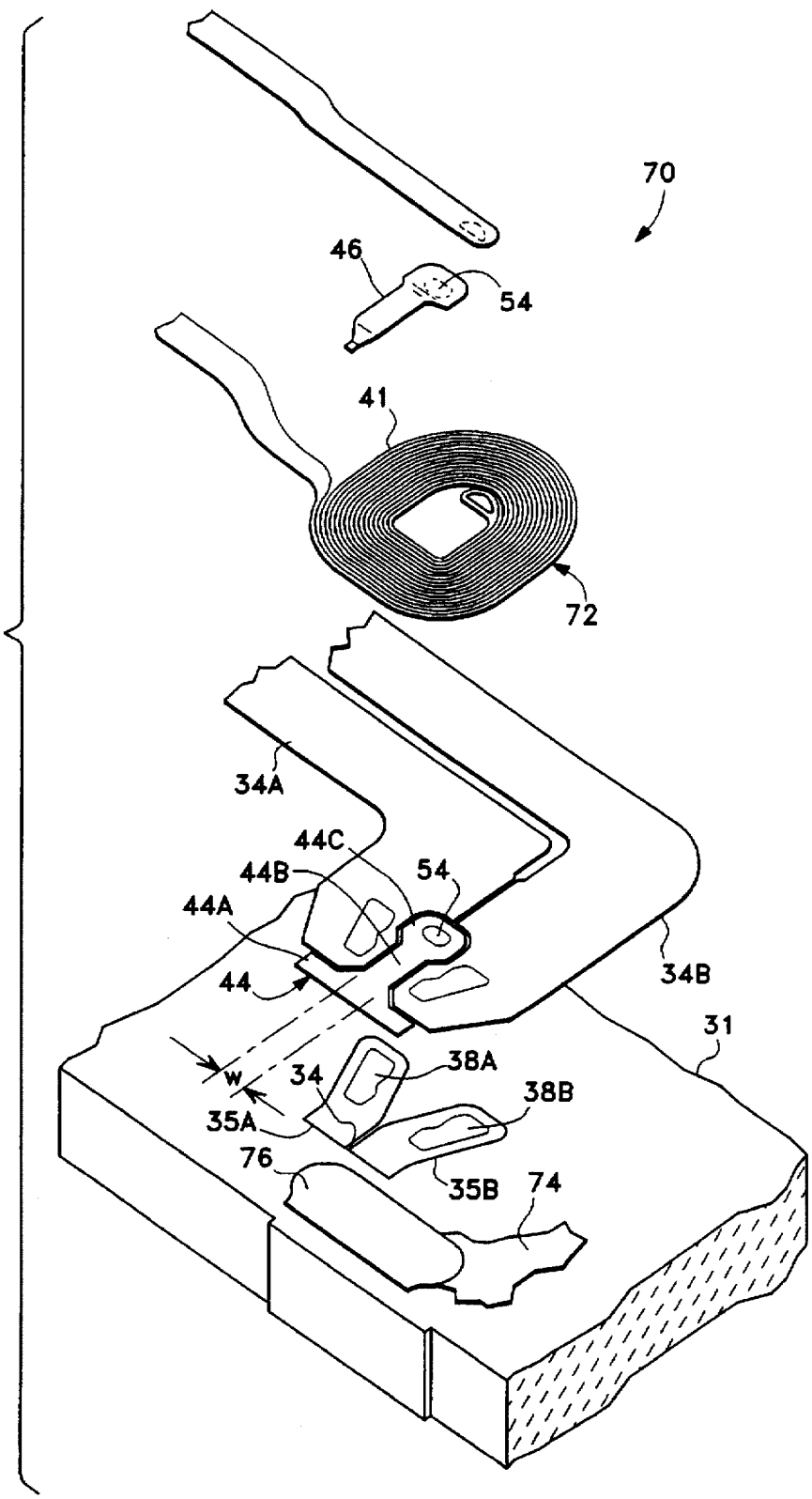
FIG. 10 is an exploded perspective view of the magnetic head of the invention shown in FIGS. 8 and 9 illustrating the relative arrangements of the various layers.
Figure 11:
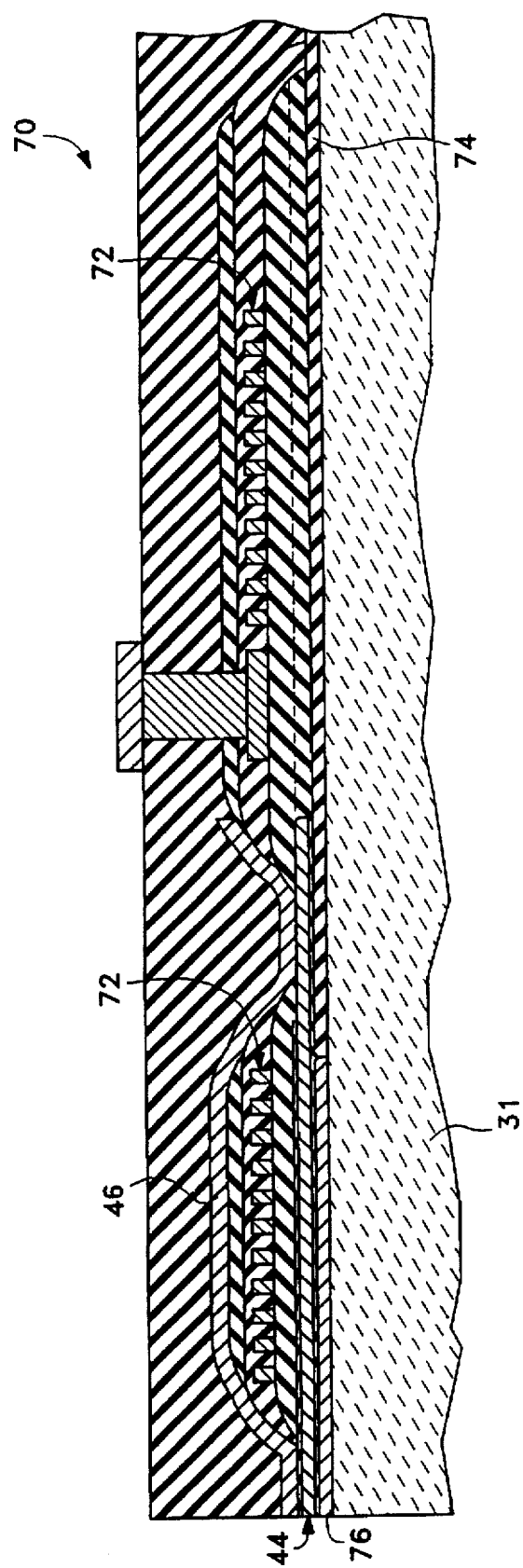
FIG. 11 is a cross-sectional view taken along the line 11—11 of FIG. 9.

FIGS. 2–6 show an embodiment of a magnetic head 28, made in accordance with this invention. For the sake of clarity, the protective and insulating layers in FIGS. 2–4 are not shown in order to expose all the relevant components of the magnetic head 28. However, the protective and insulating layers are shown in FIGS. 5 and 6. The magnetic head 28 is formed on a substrate 31, preferably made of a ceramic material that is nonmagnetic. The substrate 31 is formed with an insulating layer, as is known in the art. The magnetic head 28 includes a read transducer 30 and a write transducer 32 disposed adjacent to an air bearing surface 33. There are electrical leads connected to the transducers 30 and 32. Specifically, leads 34A and 34B are routed to the read transducer 30 and leads 35A and 35B are electrically tied to the write transducer 32.

FIG. 3 shows the read and write transducers 30 and 32 in further detail. For purpose of illustration, the hidden components behind the exposed components are portrayed in various types of ghost lines. In this embodiment, the read transducer 30 includes a magnetoresistive sensor 34, which can also be an anisotropic magnetoresistive (AMR) sensor, a giant magnetoresistive (GMR) sensor, a spin valve sensor, or any other shielded read sensor. There is a pair of first level electrical leads 36A and 36B connected to the magnetoresistive sensor 34. The electrical leads 34A and 34B are second level leads which are connected to the first level leads 36A and 36B through a pair of vias 38A and 38B, respectively. The write transducer 32 in this embodiment includes a bi-level coil 40 having first and second coil levels 40A and 40B, respectively. The electrical leads 36B and 36A are respectively connected to first and second coil levels 40A and 40B. Each of the first and second coil levels 40A and 40B comprises a plurality of windings 41. The coil levels 40A and 40B are linked together through a via 42.

FIG. 4 is a perspective exploded view of the magnetic head 28. FIGS. 5 and 6 are cross-sectional side views taken along the lines 5—5 and 6—6, respectively, of FIG. 3. For explanation purposes, FIGS. 5–6, in conjunction with FIGS. 3 and 4 are described together to illustrate the placement relationships between the various layers of the magnetic head 28.

As shown in FIGS. 3–6, the bi-level coil 40 is disposed between a first pole 44 and a second pole 46. The coil 40 is dielectrically separated from the first pole 44 and the second pole 46 through layers of insulating material 52. The two poles 44 and 46 come into direct contact with each other at a back gap region 54 at one end and are spaced by a narrow write transducing gap 55 at the other end. The magnetic poles form a continuous magnetic path with the transducing gap 55.

In a similar manner, the magnetoresistive sensor 34 is disposed between the first pole 44 and a magnetic shield 48. It should be noted that the first pole 44 performs the dual functions as a pole for the coil 40 and as a shield for the magnetoresistive sensor 34. Furthermore, the first pole layer 44 includes a front end section 44A, a mid-section 44B and a back end section 44C. The mid-section 44B has a width W which is smaller than the widths of the end sections 44A and 44C. The unique shape of the first pole 44 serves an important purpose which will be explained hereinafter.

A nonmagnetic layer 50 is disposed in juxtaposition and coplanar with the magnetic shield layer 48. In this embodiment, the nonmagnetic layer 50, which may be made of alumina, a photoresist, or other dielectric material, has an area which is comparable in size with the area of the coil 40. The alumina nonmagnetic layer or other insulator material may be deposited by physical vapor deposition, or chemical vapor deposition, or other well known techniques. The photoresist or other insulator material may be deposited by application in a liquid form. The nonmagnetic layer 74 is sized to be coextensive with the substrate the insulating nonmagnetic layer 50 is formed in juxtaposition and coplanar with the magnetic shield layer 48, as shown in FIG. 4.

In the magnetic head 28, the magnetic shield layer 48 is disposed partially overlapping portions of the coil windings 41 through the first pole layer 44. The partially overlapping relationship can best be shown in FIG. 3 in which the back edge 56 of the magnetic shield 48 is shown positioned in the central portion of the coil 40. This is in direct contrast to prior art magnetic head designs which extend the magnetic shields beyond the boundaries of the inductive coils. The rationale for the extensive areas of the magnetic shields in prior art heads is to establish planar platforms for the overlying coils. However, a large magnetic shield negatively affects the performance of the magnetic head.

The magnetoresistive read sensor of a magnetic head can be built at a miniaturized scale, thereby enabling the magnetic head to read high density data on a recording medium at high speed. The same may not be true with an inductive coil. As is well known in the art, when a current flows into the coil in an effort to generate flux changes, the coil always develops a back electromotive force (EMF) opposing any flux changes, in accordance with Lenz's law. As a consequence, the inductive coil in the write transducer may operate under a frequency limitation due to the inherent inductance with the coil. To aggravate matters further, there are various components surrounding the coil contributing mutual inductance to the coil. The mutual inductance, in addition to the self-inductance, seriously degrade the performance of the inductive portion of a merged MR magnetic head.

In a magnetic head, mutual inductance of one component contributing to another component is a complex function of various variables, such as the shapes, sizes, separation, and relative permeability ($\mu_r$) of the two components. Some components, such as the electrical leads, are nonmagnetic and assume permeability ($\mu_r$) values close to unity. However, the various magnetic layers, such as the different pole and shield layers, do not have unitary permeability. Instead, the magnetic pole and shield layers are typically formed of magnetic materials having $\mu_r$ values ranging from a few hundred to tens of thousands, depending on the material, the structure defined by the material and the frequency of the signal. For example, 78Permalloy, a common material used for the magnetic shields and poles, includes a $\mu_r$ of approximately 8,000 at initial state to approximately 70,000 at saturated state. A coil with neighboring components high in $\mu_r$ is adversely affected in performance by mutual inductance and can only respond to write current sluggishly.

Reference is now directed to FIGS. 2–6, specifically to FIG. 3. The magnetic shield 48 in this embodiment is made of Permalloy. As mentioned before, the magnetic shield layer 48 does not have an extensive area and it only partially overlaps portions of the windings 41 of the coil 40. Mutual inductance contributing to the coil 40 is reduced, resulting in the coil 40 having less overall inductance. Moreover, the first pole layer 44 assumes a unique shape having a narrower mid-section 44B, in contrast to prior art counterparts, such as the first pole in the aforementioned U.S. Pat. No. 5,486,968 which is substantially rectangular in shape. The uniquely shaped first pole layer having a narrower mid section 44B further reduces mutual inductance contributing to the coil 44.

FIG. 7 shows the problem of step-coverage commonly encountered in the processing of thin film products. During production, a metallic layer 58 is deposited on a substrate layer 60 having a step 62. Thereafter, an insulating layer 64, made of alumina, for example, is deposited on the metallic layer 58 and the substrate 60. Another metallic layer 66 is deposited on the insulating layer 64. Because of the sharp edge 62A in the step 62, the overlying layers 64 and 66 have a tendency to evenly distribute the deposited material along the direction of deposition. As a consequence, areas devoid of deposited material above the step edge 62A, such as areas 68, may result. If the areas with material deficiency occur in the metallic layer 66, there will be an open circuit. If the area devoid of material happens in the insulating layer 64, there will be an electrical short bridging the overlying and underlying layers 66 and 58. If the metallic layer 66 is one of the windings of an inductive coil, it will be a malfunctioning coil. There are a plurality of windings in a coil, and any electrical open or short in any winding may affect the final manufacturing yield and performance reliability. It is for this reason that prior art magnetic heads rely on magnetic shields with extensive areas to provide for better step coverage of the inductive coils.

With reference to FIGS. 3–6, the step coverage problem of the coil 40 is solved by the nonmagnetic layer 50 being disposed coplanar with the magnetic shield layer 48 which only partially overlaps portions of the windings 41 of the coil 40. As a consequence, there is low mutual inductance contributed by the magnetic shield layer 48 to the coil 40. Manufacturing yield and reliability of the magnetic head are not compromised because of sufficient step coverage provided by the nonmagnetic layer 50 disposed in juxtaposition and coplanar with the magnetic shield layer 48.

FIGS. 8–11 shows a second embodiment of the invention, wherein a magnetic head 70 includes a single level coil 72 having a greater number of windings 41 than the one coil level 40A or 40B of the previous embodiment. There is also a magnetic shield layer 76 which is smaller in area than the area of the coil 72. As with the previous embodiment, the magnetic shield layer 76 is disposed partially overlapping portions of the coil windings 41 through the first pole layer 44. In addition, there is a nonmagnetic layer 74 disposed in juxtaposition and coplanar with the magnetic shield layer 76. In this embodiment, the nonmagnetic layer 74 is disposed coextensively with the surface of the substrate 31. As such, the coplanar layers 76 and 74 provide the necessary planarization for the overlying layers. With the smaller size of the magnetic, shield layer 76, the mutual inductance contributing to the coil 72 is further reduced. The first pole 44 is also shaped with the mid-section 44B having a width W smaller than the widths of the end sections 44A and 44C, for the same reason of reducing mutual inductance as discussed above. The rest of the description of this embodiment is substantially the same as for the previous embodiment.

It should be noted that in all the embodiments, there are only a few extra manufacturing steps of depositing the nonmagnetic layer 50 or 74. However, the benefits gained as a higher performance head from the extra manufacturing steps are substantial. Conventional techniques of thin film processing can be used to deposit and define the layers 50 or 74.

It should be understood that other variations are possible within the scope of the invention. For example, the magnetic heads of the invention are not limited for use in magnetic disk drives only, but may be used in other magnetic storage apparatus, such as tape drives or drums. Moreover, the magnetic coil assembly may have more than two levels. A coil assembly with three or four levels may be used. The materials disclosed in the specification for the various layers need not be so limited. For instance, the magnetic shields can be made of other ferromagnetic material such as Sendust (AlSiFe). The nonmagnetic layer can be formed from other insulating materials, such as silicon dioxide ($SiO_2$), or nonmagnetic metals, such as copper (Cu) or alloys.

What is claimed is:

1. A magnetic head assembly comprising:
   a substrate on which a thin film transducer is deposited, said thin film transducer comprising:
   a first pole layer formed in an area above said substrate;
   an inductive coil having a plurality of windings disposed in a defined area on one side of said first pole layer and dielectrically separated from said first pole layer;
   a second pole layer formed above said inductive coil for forming a magnetic circuit and for defining a write gap with said first pole layer;
   a magnetic shield layer disposed on the side of said first pole layer other than said one side and dielectrically separated from said first pole layer, said magnetic shield layer having an area to partially overlap a number of portions of the windings of said coil so as to reduce mutual inductance between said coil and said magnetic shield layer; and
   a nonmagnetic layer in juxtaposition and substantially coplanar with said magnetic shield layer, said nonmagnetic layer being dielectrically separated from said portions of the windings that are overlapped by said magnetic shield layer, said nonmagnetic layer being of an area to partially overlap portions of the windings of said inductive coil other than the portions that are overlapped by said magnetic shield layer;
   wherein said first pole layer includes a front end portion, a mid-portion and a rear end portion of different widths, said mid-portion being in partially overlapping relation with said inductive coil and having a width smaller than the width of said end portions for minimizing mutual inductance between said first pole layer and said coil.

2. The magnetic head assembly as set forth in claim 1 wherein said nonmagnetic layer comprises an insulating material.

3. The magnetic head assembly as set forth in claim 2 wherein said nonmagnetic layer comprises alumina or photoresist.

4. The magnetic head assembly as set forth in claim 1 further comprising a magnetoresistive sensor disposed between and dielectrically separated from said magnetic shield layer and said first pole layer.

5. The magnetic head assembly as set forth in claim 1, wherein said nonmagnetic layer is sized to be coextensive with said substrate except for the area defined by said magnetic shield layer.

6. The magnetic head assembly as set forth in claim 5 further comprising an insulating layer in juxtaposition and coplanar with said nonmagnetic layer and said magnetic shield layer.

7. The magnetic head assembly as set forth in claim 6 wherein said insulating layer comprises photoresist and said nonmagnetic layer comprises alumina.

8. The magnetic head assembly as set forth in claim 1 wherein said inductive coil is formed as a multi-level coil.

9. The magnetic head assembly as set forth in claim 1 including one or more electrical leads in juxtaposition and coplanar with said first pole layer.

10. The magnetic head assembly as set forth in claim 1, wherein said nonmagnetic layer has portions partially overlapping windings of said inductive coil other than said number of portions of windings of said inductive coil.

11. The magnetic head assembly as set forth in claim 1 wherein the area of said magnetic shield layer is smaller than the defined area of said inductive coil.

12. The magnetic head assembly as set forth in claim 1 wherein the area of said magnetic shield layer is smaller than the area of said first pole layer.

13. A magnetic head assembly comprising:
    a first pole layer formed of ferromagnetic material;
    a second pole, layer formed of ferromagnetic material for forming a magnetic circuit with said first pole layer and for defining a nonmagnetic write gap;
    an inductive coil having a plurality of windings between and dielectrically separated from said first and second pole layers, said coil being disposed in an area on one side of said first pole layer;
    a magnetic shield layer formed of ferromagnetic material, disposed on the other side of and dielectrically separated from said first pole layer, said magnetic shield layer being of an area for partially overlapping a number of portions of the windings of said inductive coil for reducing mutual inductance between said inductive coil and said magnetic shield layer; and
    a nonmagnetic layer in juxtaposition and substantially coplanar with said magnetic shield layer, said nonmagnetic layer being of an area for partially overlapping portions of the windings of said inductive coil other than said number of portions of the windings of said inductive coil;
    wherein said first pole layer includes a front end portion, a mid-portion and a rear end portion, said mid-portion being disposed in partially overlapping relation with said inductive coil and having a width smaller than the widths of said front and rear end portions for reducing mutual inductance between said first pole layer and said coil.

14. The magnetic head assembly as set forth in claim 13, including an insulating layer in juxtaposition and coplanar with said nonmagnetic layer and said magnetic shield layer.

15. The magnetic head assembly as set forth in claim 14 wherein said nonmagnetic layer comprises photoresist and said insulating layer comprises alumina.

16. The magnetic head assembly as set forth in claim 15 including a magnetoresistive sensor disposed between and dielectrically separated from said first pole layer and said magnetic shield layer.

17. The magnetic head assembly as set forth in claim 13 including a substrate adjacent to said magnetic shield layer and said nonmagnetic layer.

18. The magnetic head assembly as set forth in claim 17 wherein said nonmagnetic layer comprises alumina and is disposed coextensively with the surface of said substrate.

19. The magnetic head assembly as set forth in claim 13 wherein said area of said magnetic shield layer is smaller than said defined area of said inductive coil.

20. The magnetic head assembly as set forth in claim 13 wherein said area of said nonmagnetic layer is approximately the size of the area of said inductive coil.

21. The magnetic head assembly as set forth in claim 13 including a plurality of electrical leads coplanar with said first pole layer.

22. The magnetic head assembly as set forth in claim 13 wherein said inductive coil is formed with a plurality of levels of windings.

* * * * *